United States Patent [19]
Guthrie

[11] Patent Number: 5,707,015
[45] Date of Patent: Jan. 13, 1998

[54] PROCESS FOR RECOVERY OF THE CONSTITUENT MATERIALS FROM LEAD ACID BATTERIES

[76] Inventor: Rhett Bob Guthrie, 16802-4 Lakewood Blvd., Bellflower, Calif. 90706

[21] Appl. No.: 195,618

[22] Filed: Feb. 9, 1994

[51] Int. Cl.$^6$ .................................................. B02C 19/12
[52] U.S. Cl. .................. 241/20; 241/24.11; 241/24.12; 241/DIG. 38
[58] Field of Search ................. 241/20, 24, 79.1, 241/DIG. 38, 24.11, 24.12

[56] References Cited

U.S. PATENT DOCUMENTS

| | | |
|---|---|---|
| 1,465,010 | 8/1923 | Young . |
| 2,398,275 | 4/1946 | Alpert . |
| 2,431,984 | 12/1947 | Bean . |
| 2,567,542 | 9/1951 | Blake . |
| 2,828,534 | 4/1958 | Pitts et al. . |
| 2,967,350 | 1/1961 | Morehart . |
| 3,152,504 | 10/1964 | Brown . |
| 3,269,870 | 8/1966 | Abramson . |
| 3,393,876 | 7/1968 | Elmore ................... 241/20 |
| 3,777,994 | 12/1973 | Fischer ................... 241/24 |
| 3,883,348 | 5/1975 | Acoveno et al. ............. 75/103 |
| 3,892,563 | 7/1975 | La Point .................. 75/97 |
| 3,940,265 | 2/1976 | Wilson .................... 75/77 |
| 4,026,477 | 5/1977 | Tremolada ................. 241/17 |
| 4,058,886 | 11/1977 | Alvarez ................... 29/563 |
| 4,118,219 | 10/1978 | Elmore et al. ............. 75/103 |
| 4,222,769 | 9/1980 | Okuda et al. .............. 75/120 |
| 4,267,980 | 5/1981 | La Point .................. 241/20 |
| 4,384,683 | 5/1983 | Huwald et al. ............. 241/19 |
| 4,397,424 | 8/1983 | Zappa et al. .............. 241/20 |
| 4,464,830 | 8/1984 | Carlsson .................. 29/763 |
| 4,830,188 | 5/1989 | Hannigan et al. ........... 209/3 |
| 5,106,466 | 4/1992 | Olper et al. .............. 204/98 |
| 5,173,277 | 12/1992 | Montgomery et al. ......... 423/92 |

OTHER PUBLICATIONS

Declaration of Rhett Bob Guthrie (signed Oct. 6, 1994).
M.A. Industries, Inc. brochure (no date given).
M.A. Industries letter dated Aug. 8, 1990 and enclosed Dewaters lead oxide to a dry cake.
Engitec Immianet s.p.a. brochure (no date given).

*Primary Examiner*—John M. Husar
*Attorney, Agent, or Firm*—Matthew F. Jodziewicz

[57] ABSTRACT

A process and apparatus for recovery of constituent materials from lead acid batteries is shown in which the battery is dismantled in a stepwise procedure under which the materials are separated, not mixed and in particular in which the grid groups are removed from the battery case and processed in a liquid, preferably water, by hydrodynamic and mechanical agitation to cause the paste material to be freed from the grids and enter the water as a mixture of fine particles while the lead grid pieces drop to the bottom. The process does not require burning or chemical reaction and can selectively recover all constituent materials including, without limitation, high quality marketable lead dioxide from the paste material.

29 Claims, 1 Drawing Sheet

PROCESS FOR RECOVERY OF THE CONSTITUENT MATERIALS FROM LEAD ACID BATTERIES

BACKGROUND OF THE INVENTION

1. Field of the Invention

This invention relates generally to a process of recovering the constituent materials from lead acid batteries. In particular, it relates to an energy efficient and environmentally favorable hydrodynamic and hydromechanical separation process for the selective recovery of the constituent materials, including particulate battery paste material. Such material is known to comprise a high concentration of lead dioxide. ($PbO_2$). The methods of the present invention do not necessarily involve the addition of heat or chemicals, chemical reactions, burning, or the release of appreciable amounts of air emissions. The present invention will allow the recovery of the constituent materials with only minimal waste residue and the handling of which is controllable.

2. Description of the Prior Art

The disposal of lead acid batteries has long been considered a problem. Searching for solutions to this problem has provoked concomitant interest in recycling materials for reuse, and in the case of the sulfuric acid electrolyte, in neutralizing it for safe disposal. Many of the constituent materials of lead-acid batteries have attracted interest in recovering them for reuse. In some cases the constituent is recovered in its in situ form, and in other cases it is recovered as a reaction product in a chemical reaction. Accordingly a number of different processes have been devised, and various equipment has been assembled and designed for these purposes.

Processes and equipment for recovery of materials are described in the following U.S. Pat. Nos.;

2,398,275; 2,567,542; 2,828,534; 2,967,350; 3,152,504; 3,269,870; 3,883,348; 3,940,265; 4,058,886; 4,118,219; 4,464,830; 4,222,769; 4,769,116; 5,106,466 and 5,173,277 and the references cited therein.

The prior art processes for the recovery of lead containing materials either operate on the entire battery en mass, or use smelting, or chemical processes, or a combination of these, to obtain resultant products.

The earlier lead recovery methods consume great quantities of energy and expel relatively large quantities of air emissions and solid waste and have a high cost for the end product which is typically an ingot of metallic lead or feedstock for lead production. An advantage has therefore developed for more efficient and more environmentally favorable methods for lead recovery. A further advantage exists for the recovered materials to be of acceptable quality and purity for sale to end users, without smelting. Further, there is an advantage for a process and equipment to permit the selective recovery of constituent materials. In particular, an advantage exists for the recovery of lead dioxide in a sufficiently pure form that it can be used as lead dioxide, rather than merely as furnace feedstock to produce metallic lead.

Methods in commercial use of processing lead acid batteries require high levels of energy coupled with a heat source, and yield relatively large quantities of waste residue and air emissions.

SUMMARY OF THE INVENTION

The present invention is a process for converting lead acid batteries into usable end products without the addition of any chemicals, without the use of heat, or burning and with only minimal waste residue; adding only water. The process permits recovery of constituent materials in which the battery is dismantled in a stepwise procedure under which the materials are separated, not mixed, and in particular, in which the grid groups are removed from the battery case and further processed to be separated into their constituent materials in a liquid, preferably water, in a chamber or mixing area by hydrodynamic and possibly also mechanical agitation to cause the paste material to be freed from the grids and enter the liquid as a mixture of fine particles while the lead grid pieces drop to the bottom of the chamber or mixing area. The process does not require burning or chemical reaction and can selectively recover all constituent materials including, without limitation, lead dioxide from the paste material. The invention process involves draining the electrolyte, cutting the battery cover off, cutting the battery case containing grid groups into smaller pieces, removing the cut up battery grid groups, putting the cut pieces of the grid groups into a liquid body mixing area or chamber and agitating the parts in the liquid body to separate the constituent materials of the grid groups. In particular, the grid groups containing the paste material (which is mostly lead dioxide), and the lead of the grids are hydrodynamically and mechanically agitated in a liquid body mixing area to separate those materials and then, using gravity and a single- or multi-cell classifier or settling chambers to isolate them.

At each step, the selected material removed can be specifically further processed for recovery. For example, the drained sulfuric acid can be recovered, the plastic cover and case pieces can be recovered and recycled, the lead posts and connectors can be recovered and recycled as metallic lead, the lead dioxide of the paste can be recovered for reuse as lead dioxide, and breaker mud in the case pieces can be processed to recover various sulphated compounds of lead.

There are very small amounts of other materials in the paste, but the compound of interest and which is nearly all of it, is $PbO_2$. The exact composition is not clearly known, nor is it constant as it will vary from one battery to another. Analysis techniques are less than perfect. For purposes of the present invention the paste is presumed to be $PbO_2$.

In one aspect the process of the invention utilizes an enclosed or environmentally protected apparatus that generates almost no air pollution, and requires less energy and produces almost no waste as compared to prior processes. There are no chemical reactions or burning or heat addition necessarily involved and only water, preferably deionized or distilled water, needs to be added to the process.

In its most extensively developed configuration, the process will permit selective recovery of all the constituent elements of the battery in usable form. In a specific configuration, the invention is directed to a process for obtaining the lead-containing elements from the internal parts of lead acid batteries. In further particular, the method separates the lead alloy grids from the paste material carried on the grids. The method preferably uses water, preferably deionized or distilled water, as the only required added ingredient to the process aside from the machinery used. No heat need be added during the process. The water is recycled so that there is no water to be disposed of. The resultant products include a high purity lead dioxide in fine particulate form ready to be introduced by a user into a process for preparing new products. The lead parts such as lead posts, connectors and the grid pieces can be processed in any manner desired by a customer, including the production of lead ingots.

In the method of the present invention, the internal portions of a battery, the grids or plates, referred to herein as grid groups are removed from the battery case. Removal of the grid groups is facilitated by cutting the cover off the battery, after draining the sulfuric acid. Draining is facilitated by creating one or more openings in the top corner along one side of the battery and tilting it for a period sufficient to allow the electrolyte to drain through the holes. This permits electrolyte to be drained more completely than prior methods. Complete draining maximizes the purity of the recovered constituent materials and reduces contamination of water used in other portions of the process.

After the cover is cut off, the grid groups could be removed. However, it has been found that the whole grid groups, when tumbled and agitated in the closed hydromechanical chamber, tend to "ball up" which prevents complete removal of the paste from the grid. It has been determined that cutting the grid groups into smaller portions prevents this problem. For example, in a preferred method the case is cut lengthwise into approximately equal halves and then each half is cut again lengthwise into approximately equal quarters. Other configurations which similarly reduce the size of the pieces are also possible. Then the grid group pieces are removed from the case, leaving the breaker mud in the lower quarters of the case pieces. The cutting also facilitates the removal of the grid group pieces, which allows the paste material and grids to be processed separately from the breaker mud. The breaker mud which is composed of various sulphated compounds of lead resides at the bottom of the battery. It is beneficial not to mix the breaker mud and paste material, because the paste material is a high concentration of lead dioxide while the breaker mud is various sulphated compounds of lead. Also, the cutting of the case isolates the breaker mud into two of the case quarters.

The grid groups are put into a tumbling or mixing area chamber, in water, and agitated until the paste material, battery separator material and grid material have all been separated. There is also a small amount of residual sulfuric acid which will mix with and be diluted by the water. The water is agitated by hydrodynamic action (i.e. agitating the water) and can be enhanced by pumping a water stream into the water body. The paste material comprising lead compounds, mainly lead dioxide will mix as fine particulates in the water. The battery separator material will also be mixed in the water although it will tend to float to the surface. The grids and larger chunks of lead compounds will sink to the bottom of the chamber. The water and waterborne materials in mixture are then moved from the chamber. These are the battery separator pieces and the water entrained lead compounds (the paste material). The battery separator material is filtered out and the water and the paste materials are gradually separated in a single-cell or multi-cell classifier by gravity sedimentation.

Although a batch process may be employed for treating the grid groups, a continuous process is also contemplated in which grid group raw materials enter at one point and the separated portions are removed along a continuously moving water body.

The lead compound particulates are collected and may be dewatered to a preselected wetness level for sale to users. The grids are recovered as large pieces and as smaller "chips" suitable for melting by the end user. The rest of the battery parts, such as the cover and case sections, can be processed to recover plastic. The lead posts and connector parts can be processed for reuse as lead. Also the residual paste particulates which are deposited on the plastic, and the breaker mud are both recovered. The portions of the case which contain collected breaker mud (the case bottom quarters in the specific example) can be separated and processed independently of the cover and other case sections in order to recover the various sulphated compounds of lead possibly including high quality lead sulphate.

DETAILED DESCRIPTION

Figure 1:
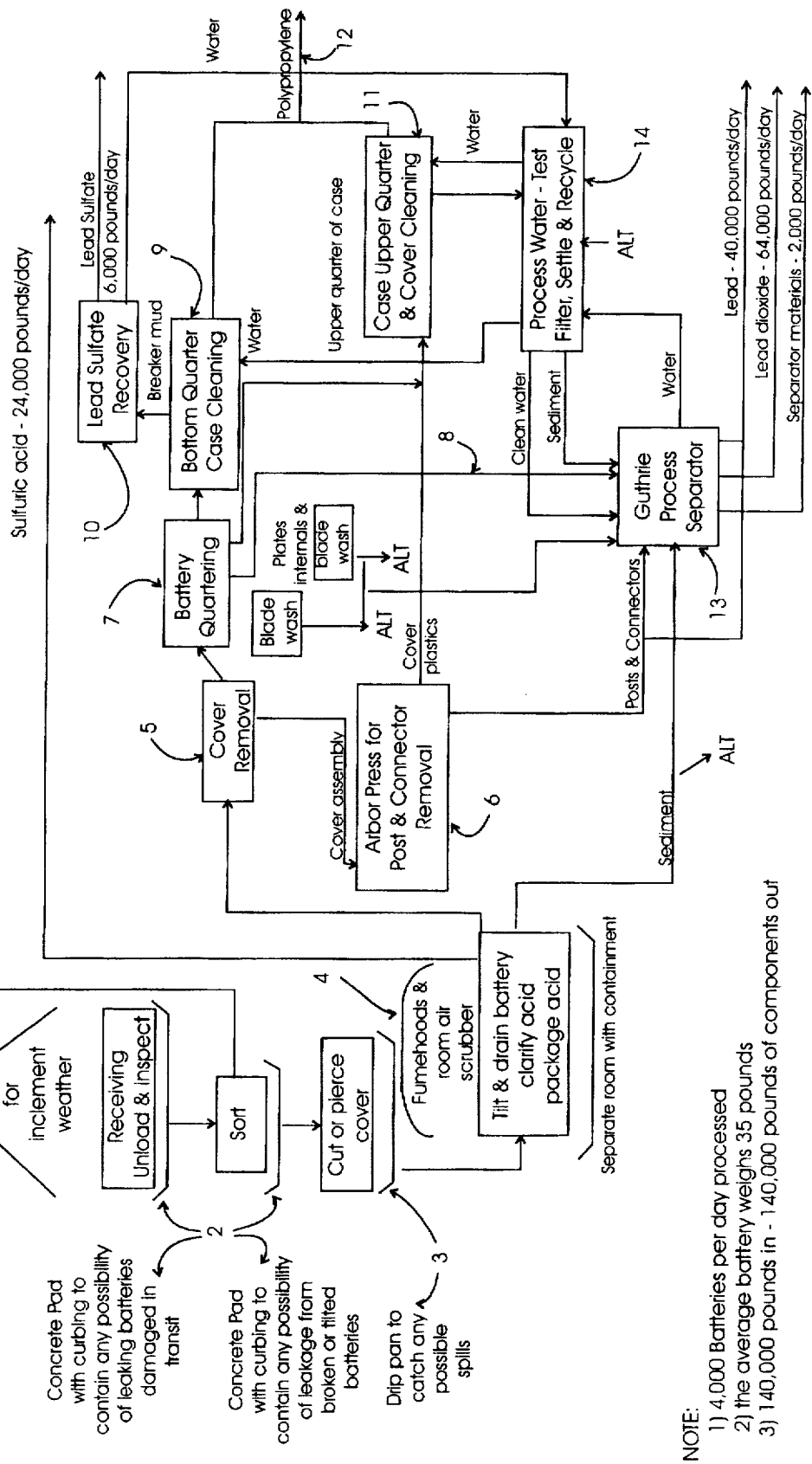
FIG. 1 is a mass flow chart for the invention.

In the past, and likely into the future, lead acid batteries have been disposed of from the point of view of the original user as scrap or scrapped, junk or junked and the like. However the present invention sees lead acid batteries as a raw material for an industrial segment, referred to commonly as recycling, in which products for sale are the end result, as contrasted with disposing of old items with some incidental reuse of some portions. This change, from the new industry's point of view raises a new perception and therefore provokes a new description of that raw material. No longer is it a scrapped or junked battery. In fact, those names may be in error. The batteries to be employed will in large part be those whose useful life is over; but there are also damaged but unused batteries and other rejects. Further, such batteries are frequently not scrapped or junked in the old sense of being sent to a junkyard or perceived as useless. Increasingly the battery enters a pre-arranged industrial segment, its value already being appreciated and its disposition for recycling of constituent materials pre-planned. Thus in this patent, recognizing the modern view, no characterization is used, and all lead acid batteries are seen as potential subjects for the invention.

In the methods and apparatus of the present invention lead acid batteries are processed in a manner to selectively permit separate recovery of all the constituent elements.

In particular, in one aspect the method and apparatus permits recovery of the particulate paste material, primarily lead dioxides.

The other materials available for recovery are; lead sulphate, lead, case material, sulfuric acid, and separator materials.

Treatment of the battery grid groups for recovery of particulate paste material, and lead from the plates is accomplished in a portion of the method and apparatus as described below which is referred to as the Guthrie Process Separator.

The methods of the present invention are available for use on conventional lead acid batteries. The construction of these batteries varies somewhat; but they are sufficiently consistent in construction that all or nearly all such batteries can be processed according to the methods herein described. Any particular battery construction which is not suitable for this process would be culled out before processing begins. As will be described, batteries may be separated into groups of like construction in order to obtain uniform and high quality resulting materials from the recovery processes and to speed the process.

The typical lead acid battery as seen by a scrap processor consists of a cover containing lead posts and connectors, a case and internal elements in the case; the internal elements being separated into grid groups defining the battery cells, these being referred to herein as grid groups or simply, groups. That is, a grid group consists of lead plates, separators and paste material. Some residual sulfuric acid will be present as well. A plate is also sometimes referred to as a grid. The cover is a rigid plastic structure which typically has external lead connection posts and internal lead connector elements which provide the power path to the cells. Some batteries, known as "side mounts", are constructed in a configuration with the terminals mounted on and through one side near the top of the case, the connector elements being held inside. This construction only imposes a minor variation in the process as described herein.

The plastic portions of the cover may have a relatively complex molded structure, but in all battery constructions the cover attaches to the sides of the case.

The case is plastic having relatively thin sides and a rather complex molded interior including internal plastic walls defining cells in which the grid groups are separately contained. In the past, other materials have been used for the case, such as rubber, ebonite, wood, and compositions (of tar). In the future, different materials are hypothetically possible.

As a battery deteriorates a number of changes take place, those changes in the grid group materials being of particular concern in the recycling process.

For example, the grid dimension will typically enlarge or swell. The grid will weaken, become friable and fragile. In particular, the positive grids will severely deteriorate structurally, the negative grids less so. An oxidation-reduction reaction creates electrochemical energy and converts some of the paste materials to various sulphated compounds of lead. In the lifespan of the battery small amounts of these sulphated compounds shed from the grid groups and settle to the bottom of the battery. This bottom material is called breaker mud. Some of the sulphated compounds may be present in the grid groups. The lead oxide in the paste becomes lead dioxide, and as will be seen this material is the subject of special focus in the invention. Also, there are small amounts of other materials, of inconsequential quantity.

In the present invention, it is possible to selectively recover, separately, each constituent material of the battery with the addition of extremely little energy, creation of very little effluent or other pollutant and no chemical reaction. This is accomplished by isolating the various materials before they are intermixed; except for the procedure in the Guthrie Process Separator, which is quite special.

The invention in its overall content will be described with reference to the Mass Flow Diagram of FIG. 1. In this diagram the example is taken of processing of 4,000 batteries per day at 35 pounds per battery for a total processing weight of 140,000 pounds per day. The output of the diagram shows recovery of 140,000 pounds per day.

The steps will be described according to the numbers in FIG. 1. It should be apparent that some steps must be performed in a specific order, while others may be performed in different orders than described below, and in some cases the order of performing steps is irrelevant.

1. Batteries are delivered.
2. Batteries are inspected and sorted. Batteries are sorted to ensure that the rest of the process proceeds with batteries of similar construction so that various adjustments of the process and equipment can be made for optimum efficiency.
3. Drain openings are made in the cover to facilitate draining of sulfuric acid. This can be done by punching, drilling or otherwise making openings along one edge of the battery where the top and a side of the case form a corner, registered for each cell. Alternatively, the entire corner could be cut off.
4. The battery is tilted to drain the sulfuric acid which is captured in a containment means. The sulfuric acid is then clarified to remove any foreign material, such as particulate lead sulphate, lead dioxide or fragments of lead or plastic; however it is considered that the material is predominantly lead dioxide present as fine particles. This material, designated sediment may be separately further processed, or may be inserted into the Guthrie Process Separator as is shown by the process line for flow of the settled sediment wherein the "alt" designation shows flow into block 14 where process water is recovered and recycled. However, in this case it may be preferable to not mix this sediment with the process water or place it in the Guthrie Process Separator as the sediment may contain sulfuric acid or sulphated compounds of lead which would reduce the purity of the lead dioxide.
5. The cover is removed along a cutting plane which exposes but does not cut the grid groups. A subprocess in this step is the step of washing the cutting blade and collecting solid residue. While this could be directed into the Guthrie Process Separator, it may be desirable to direct this water and the residue in it into the water recovery step 14 in order to maintain purity of the particulates recovered in the Guthrie Process Separator. This is shown by the "alt" designation.
6. The cover is further processed to separate the metallic lead posts and connecting material, and the plastic. Each of these is then available for further processing, the lead for melting, and the plastic for recycling to new products. Some or all of the lead posts and connectors could be directed into the Guthrie Process Separator to provide a hammering effect on the grid groups or to facilitate collecting all metallic lead in one place.
7. The battery case is cut, reducing the size of the grid group pieces and facilitating removal from the case as well as facilitating further processing of the case pieces. Preferably the battery is quartered by a first cut lengthwise through the grid groups, cutting the battery into halves. Each half is then cut lengthwise again, to produce quarters. Thus there are two bottom quarters and two upper quarters. The size of the grid group pieces is reduced in these steps. It has been found that whole grids will "ball up" in the Guthrie Process Separator which interferes with complete recovery of paste material. As with step 5, a subprocess is washing the cutting blade and collecting residue from the cutting step. This residue can be collected as at step 14 or can be recovered in the Guthrie Process Separator.
8. Thus this cutting provides smaller grid group pieces, which will allow the paste material to be thoroughly driven out. Also, the cutting facilitates the removal of the grid groups from the case quarters. The grid group pieces are removed from the quarters and proceed to the Guthrie Process Separator.
9. The case bottom quarters containing breaker mud are water cleaned by hydrodynamic action to mix the breaker mud in the water.
10. The breaker mud is separated from the water, preferably by gravity settling from the water; and then further processed such as by dewatering and packaging for use by an end user.
11. The case upper quarters and cover are water cleaned by hydrodynamic action to remove particulate material. The particulate material is separated from the water preferably by gravity settling; and then further processed such as by dewatering and packaging for use by an end user. It is considered that this particulate material is predominantly lead dioxide, so it may conveniently be transferred in a water mixture into the Guthrie Process Separator or it may be processed separately.

12. All the plastic parts; the case bottom quarters, the case upper quarters and the cover, are gathered for further processing for recycling in new products.

13. The grid group pieces are delivered to the Guthrie Process Separator. This process can be either by batch or continuous processing. It will be first described as a batch process. The grid group pieces are delivered to a mixing area which is a tumbling chamber having water, preferably deionized or distilled water in it. The water can be room temperature. In the tumbling chamber the water is vigorously agitated. Also, vanes or other structures can be deployed on the wall of the tumbling chamber to strike the grid pieces. In the tumbling chamber due to the hydrodynamic action of the agitation, and, if employed, by the mechanical action of the vanes or other structures, (or lead posts and connectors if desired) the paste material will be thoroughly separated from the grids and mix with the water as finely divided paste particulates, most importantly lead dioxide. Also the battery separators will break up and, like the paste particulates, will become waterborne. The lead grids will remain as larger pieces although there will be some quite small pieces referred to as "chips". These will be allowed to collect at the bottom of the tumbling chamber. Other pieces referred to as "peas" include still smaller pieces of lead grid material and chunks of lead dioxide which do not become finely divided. The peas too are allowed to collect in the bottom of the chamber.

The water mixture with paste materials and separator materials are removed by emptying the tumbling chamber or by continuous overflow from the tumbling chamber. A primary filtering step removes most of the separator material. Additional filtering later in the process can be employed to further remove separator fragments.

Then the water with the paste particulates is run through one or more settling steps to remove the solids.

Classified or multiple stage gravity settling can be used to separate the product into selected particle size ranges.

The settled material, lead dioxide, is then dewatered to a selected wetness level. A wetness level of 1% to 5% is considered favorable for handling purposes.

In a continuous process the grid groups can be continuously fed into a mixing area, the agitation preformed by hydrodynamic and if desired mechanical action to free the paste material, and the liquid mixture continuously removed. Alternatively, the grid groups can be batch delivered to a mixing area, agitated and the mixture removed by batch or continuous overflow or other means.

While water is described as the liquid, an aqueous mixture of water and selected additives may be employed to enhance separation and settling of the paste material.

14. Water used in steps 9, 11 and 13 is delivered to a final filtering and settling process, (14) and is available for reuse in the process. Particulate sediment can be delivered to the Guthrie Process Separator or can be kept separate depending on its composition. For example, if high purity lead dioxide is being recovered from the Guthrie Process Separator it might be undesirable to mix in the sediment from final filtering (14) which might contain various sulphated compounds of lead. Similarly residue from steps 4 (sediment), 5, and 7 could be directed into the Guthrie Process Separator; but if this would contaminate the resultant lead dioxide product, then these flows should be directed elsewhere either to block 14, the process water recycling step or for special treatment.

By the particular steps, and as necessary, the order of steps described above, each of the constituent elements of the battery can be separated from the others and thereby be available for reuse or recycling to new products. This is done without the addition of energy for burning; or chemicals for reacting, nor is there any appreciable effluent or waste pollution, and all incidental spillage can be readily controlled. The system uses room temperature water, and the mechanical preparation steps and settling as described above.

Although water (including deionized or distilled) alone is contemplated, it may be desirable to add an additive to the water to enhance effectiveness of the process. For example, a densifyer may be added to enhance separating of materials, such as by causing the battery separator material to float and not sink in the water. Also, detergent, or surfactant may be added to enhance the process for more complete recovery of the paste particles.

The amount of each material recovered as shown in FIG. 1 is an approximation intended to show the general scope of proportions.

The Guthrie Process Separator could be performed as a batch means and apparatus. However, it could be performed continuously so long as there is adequate agitation of the water, and as desired, mechanical striking on the grid groups. Also, the grid groups could be partially airborne and struck with a stream of water in combination with mechanical action. The purpose being to cause the paste material to be washed, agitated or knocked out of the grids and to break the paste material into fine particulates to mix with the water.

TEST PROCEDURE

Five lead-acid batteries were selected of assorted common brand labels.

A series of holes was drilled in the cover of each battery near one lengthwise corner, and in communication with each cell of the battery.

All the batteries were tilted and the sulfuric acid drained out.

Then the cover was cut off each battery.

Then each battery was cut once lengthwise through the grid groups along a vertical plane and a second time lengthwise through each of the halves to produce four quarters, two lower case quarters, and two upper case quarters.

Next the grid group pieces were removed and placed in a rotary tumbling chamber having an opening near the top.

Water was sprayed into the chamber while it was tumbling and the water was allowed to exit the top by mechanical expulsion. The tumbling and expulsion proceeded for about 45 minutes. During this time, paste material in fine particulate form became mixed with the water, having been removed from the grids. Also, separator fragments became mixed with the water. The expelled water mixture was filtered to remove the separator fragments and run into a 55 gallon drum for settling of the paste material. Two more 55 gallon drums were placed in series for additional settling; and further filtering was performed for separator material.

Pieces were recovered from the bottom of the tumbling chamber. In the tests, the materials at the bottom of the chamber were separated into 3 groups:

1. large pieces of grid
2. smaller pieces of lead from the grids (referred to as chips)
3. still smaller pieces of lead and chunks of paste material (referred to as peas)

The material recovered from the settling drums was collected. It was a red brown color, of very fine particles.

A semiquantitative analysis of the fine particulates was performed, and the analysis showed:

|  | Lead Dioxide |
| --- | --- |
| Pb | 83.4% (98.6% PbO$_2$)* |
| Fe | .20 |
| Si | .044 |
| Sb | .61 |
| Sn | 0.051 |
| Ba | 0.085 |
| B | 0.0027 |
| Mn | 0.0029 |
| Bi | 0.0095 |
| Mg | 0.0058 |
| Al | 0.0092 |
| Ca | 0.051 |
| Cu | 0.0041 |
| Ti | 0.0019 |
| Ag | 0.0016 |
| Ni | TR< 0.0003 |
| Cr | 0.00048 |
| Other elements | nil |
| Loss on drying | 3.88% |

*This designates that if the lead content is all in lead dioxide then lead dioxide is present in a concentration of 98.6% of the tested material.

Another analysis of the sample showed:

| Carbon | 0.16% |
| --- | --- |
| Sulphur | 1.73% |

A second test as above described was performed and the fine particulates were analyzed. A semiquantitative analysis showed:

| Pb | 92.% (99.25% PbO$_2$)* |
| --- | --- |
| As | 0.22 |
| Sb | 0.11 |
| Sn | 0.074 |
| Mg | 0.0019 |
| Si | 0.032 |
| Fe | 0.0068 |
| Al | 0.015 |
| Cu | 0.00034 |
| Ag | 0.0022 |
| Ca | 0.033 |
| Sr | 0.13 |
| Other elements | nil |
| Total ash | 59.43% |

*This designates that if the lead content is all in lead dioxide then lead dioxide is present in a concentration of 99.25% of the total material.

X-ray diffraction and infrared spectrophotometry showed the presence of the following compounds:

$PbO_2$
$Pbo.PbS_4$
$PbSO_4$
$BaS_3O_{10}$ (not certain)

Thus the process is capable of permitting selective recovery of each of the six (6) major components present in lead acid batteries. This is particularly done by avoiding mixing of materials, but instead, isolating them before they are mixed. For example, the breaker mud present at the bottom of the case is kept separate from the paste material in the grid groups. This allows the paste material to be recovered in a highly pure form as lead dioxide; while the breaker mud can be used as well. Similarly, the case parts and lead parts and connectors are not broken into small pieces and mixed together only to be later separated or burned off.

Thus the order of steps, as well as the particular steps, as can be seen, will allow these materials to be separated at a time when they can be most easily segregated, eliminating the need to resort to burning, or chemical reactions to segregate and separate and leaving each material readily accessible for treating separately. This is particularly emphasized in processing the grid groups in the Guthrie Process Separator to recover the paste particulates easily and uncontaminated by other materials. The breaker mud has already been separated, and no plastic from the battery case will be present in the Guthrie Process Separator. Also however, as an alternative, the lead posts and connectors could be placed into the Guthrie Process Separator which would aid in mechanical action to release the paste particulates and reduce paste "peas" to fine particles. Of course, these lead parts would drop to the bottom of the Guthrie Process Separator along with the lead grids thereby grouping all the metallic lead together.

Other battery constructions which have some similarity to lead-acid batteries could also be processed by the above disclosed invention. For example, Nickel-Cadmium batteries have internal assemblies which comprise several materials, and separation of the cases and then processing the internal assemblies for separation could be accomplished.

Although particular embodiments of the invention have been described and illustrated herein, it is recognized that modifications and variations may readily occur to those skilled in the art, and consequently it is intended that the claims be interpreted to cover such modifications and equivalents.

I claim:

1. A method of recovering the paste material in grid groups from lead acid batteries comprising:

removing and separating the grid groups and any paste material attached thereto from the battery case and any mud, containing various sulphated compounds of lead contained therein;

causing the release of paste material from the grid groups in particulate form into a liquid mixture by agitating the grid groups in a liquid;

separating the particulate paste material from the liquid.

2. The method of claim 1 in which the agitation is cause by hydrodynamic action.

3. The method of claim 2 in which the agitation is further caused by mechanical action.

4. The method of claim 1 in which the liquid is water.

5. The method of claim 4 in which the water is selected from the groups consisting of 1) deionized water
   2) distilled water
   3) a mixture of deionized and distilled water
   4) a mixture of 1), 2) or 3) above and an additive selected from the group consisting of: a densifier, a detergent, and a surfactant.

6. The method of claim 3 in which the release of paste material in particulate form is caused by placing the grid groups in a mechanical mixing chamber containing water.

7. The method of claim 1 further comprising placing the liquid and particulate paste material mixture into at least one settling chamber to settle out by gravity the particles of paste material.

8. The method of claim 1 further comprising before removing the grid groups from the battery case;

cutting the battery case and grid groups therein into smaller pieces.

9. The method of claim 8 wherein the cutting step further comprises;

cutting the battery case lengthwise into approximately equal size case halves; and cutting the case halves lengthwise into approximately equal size case quarters.

10. The method of claim 1 further comprising filtering out larger materials in the liquid mixture while allowing the particulate paste material to remain in the mixture with the liquid.

11. The method of claim 1 further comprising;

allowing material of the grid groups which is heavier than the particulate paste material to settle out of the liquid prior to separating the particulate paste material from the liquid.

12. The method of claim 11 further comprising removing said heavier materials from the mixing chamber and separating the particulate paste material from the liquid by settling.

13. A method of recovering constituent materials from lead-acid type batteries;

draining the battery;

cutting the cover off the battery;

removing the grid groups from the battery case;

causing the paste material in the grid groups to become mixed in particulate form in a liquid mixture by agitating the grid groups in a liquid.

14. The method of claim 13 in which the agitation is caused by hydrodynamic action.

15. The method of claim 14 in which the agitation is further caused by mechanical action.

16. The method of claim 15 in which the liquid is primarily water.

17. The method of claim 16 in which the paste material is separated from the liquid by settling.

18. The method of claim 14 further comprising allowing particulate paste material to settle out of the liquid mixture.

19. The method of claim 18 further comprising dewatering the particulate material to a pre-selected wetness level.

20. The method of claim 13 further comprising cutting the grid groups into smaller pieces before agitating them in a liquid.

21. The method of claim 13 further comprising filtering battery separator material out of the liquid and particulate paste material mixture after agitating.

22. The method of claim 13 further comprising allowing materials which are heavier than the particulate paste material to settle out of the liquid during agitation in the liquid.

23. The method of claim 13 further comprising, before removing the grids from the battery case;

cutting the battery case and grid groups therein into smaller pieces.

24. The method of claim 23 wherein the cutting step further comprises; cutting the battery case and grid groups therein lengthwise a preselected number of times.

25. The method of claim 13 further comprising separating non-paste material from the mixture of liquid and paste material.

26. The method of recovering constituent materials from lead-acid batteries comprising;

draining the battery;

cutting the cover off the battery;

separating the grid groups from the battery case;

providing a separator comprising a mixing area;

delivering the grid groups into the separator mixing area;

delivering an aqueous liquid into the separator mixing area;

agitating the grid groups in the aqueous liquid to cause paste materials in the grid groups to be mixed with the aqueous liquid;

removing liquid mixture from the mixing area;

delivering the mixture of paste materials and aqueous liquid to a settling area; and allowing the paste materials to settle out of mixture with the aqueous liquid.

27. The method of claim 26 wherein the separator mixing area comprises a rotatable mixing chamber.

28. The method of claim 27 wherein the separator mixing area comprises a means for one of 1) continuously introducing grid groups to the area and 2) periodically introducing a batch of grid groups to the area and a means for one of 1) continuously removing the mixture of paste materials and aqueous liquid from the mixing area and 2) periodically removing the mixture of paste materials and aqueous liquid from the mixing area.

29. The method of claim 28 further comprising allowing the paste materials in mixture with aqueous liquid to settle after being removed from the mixing area.

* * * * *